(12) United States Patent
Harcourt et al.

(10) Patent No.: US 7,789,555 B2
(45) Date of Patent: Sep. 7, 2010

(54) TEMPERATURE SENSOR

(76) Inventors: Colin Harcourt, 9328—37 Avenue, Edmonton, Alberta (CA) T6E 5K3; Stefan Thorsteinson, 9328—37 Avenue, Edmonton, Alberta (CA) T6E 5K3

( * ) Notice: Subject to any disclaimer, the term of this patent is extended or adjusted under 35 U.S.C. 154(b) by 8 days.

(21) Appl. No.: 11/700,323

(22) Filed: Jan. 31, 2007

(65) Prior Publication Data
US 2007/0175266 A1 Aug. 2, 2007

(30) Foreign Application Priority Data
Jan. 31, 2006 (CA) .................. 2535499

(51) Int. Cl.
*G01K 1/00* (2006.01)
(52) U.S. Cl. .................. 374/147; 374/208
(58) Field of Classification Search .............. 374/147, 374/208
See application file for complete search history.

(56) References Cited

U.S. PATENT DOCUMENTS

| | | | |
|---|---|---|---|
| 3,143,439 A | 8/1964 | Hansen | |
| 3,151,484 A * | 10/1964 | Mohn et al. | 374/147 |
| 3,874,239 A | 4/1975 | Finney | |
| 3,907,606 A * | 9/1975 | Chang | 136/233 |
| 3,939,554 A | 2/1976 | Finney | |
| 4,043,200 A | 8/1977 | Finney | |
| 4,164,433 A | 8/1979 | Granahan et al. | |
| 4,338,479 A | 7/1982 | Bauman | |
| 4,477,687 A | 10/1984 | Finney | |
| 4,549,162 A * | 10/1985 | Grimm | 338/28 |
| 4,767,468 A | 8/1988 | Finney | |
| 4,971,452 A * | 11/1990 | Finney | 374/208 |
| 5,141,335 A | 8/1992 | Wannamaker et al. | |
| 5,454,641 A * | 10/1995 | Parker et al. | 374/120 |
| 5,901,900 A | 5/1999 | Finney | |
| 6,158,886 A | 12/2000 | Dutcher et al. | |
| 6,334,707 B1 * | 1/2002 | Ku | 374/208 |
| 6,338,571 B1 * | 1/2002 | Chen | 374/208 |
| 6,761,480 B2 * | 7/2004 | Parnicza et al. | 374/179 |
| 2005/0129089 A1 * | 6/2005 | Glozman et al. | 374/185 |
| 2006/0165153 A1 * | 7/2006 | Tillman et al. | 374/208 |

FOREIGN PATENT DOCUMENTS

| | | |
|---|---|---|
| CA | 1012258 | 6/1977 |
| CA | 1016666 | 8/1977 |

* cited by examiner

*Primary Examiner*—Gail Verbitsky
*Assistant Examiner*—Mirellys Jagan
(74) *Attorney, Agent, or Firm*—Davis & Bujold, P.L.L.C.

(57) ABSTRACT

A temperature sensor includes a heat conducting metallic contact pad having a contact surface. A sensor probe is embedded in the contact pad. Conductive wires extend through the contact pad and are connected to the sensor probe.

1 Claim, 5 Drawing Sheets

TEMPERATURE SENSOR

This application claims priority from Canadian Application Serial No. 2,535,499 filed Jan. 31, 2006.

FIELD OF THE INVENTION

The present invention relates to a temperature sensor and, in particular, a temperature sensor used in tubes and pipes such as are found in boilers.

BACKGROUND OF THE INVENTION

U.S. Pat. No. 5,141,335 (Wannamaker et al 1992) entitled "Thermocouple Connector" is an example of a form of temperature sensor used in boiler tube applications.

SUMMARY OF THE INVENTION

According to the present invention there is provided a temperature sensor which includes a heat conducting metallic contact pad having a contact surface. At least one sensor probe is embedded in the contact pad. Conductive wires extend through the contact pad and are connected to the sensor probe.

BRIEF DESCRIPTION OF THE DRAWINGS

These and other features of the invention will become more apparent from the following description in which reference is made to the appended drawings, the drawings are for the purpose of illustration only and are not intended to in any way limit the scope of the invention to the particular embodiment or embodiments shown, wherein.

DETAILED DESCRIPTION OF THE PREFERRED EMBODIMENT

Figure 1:
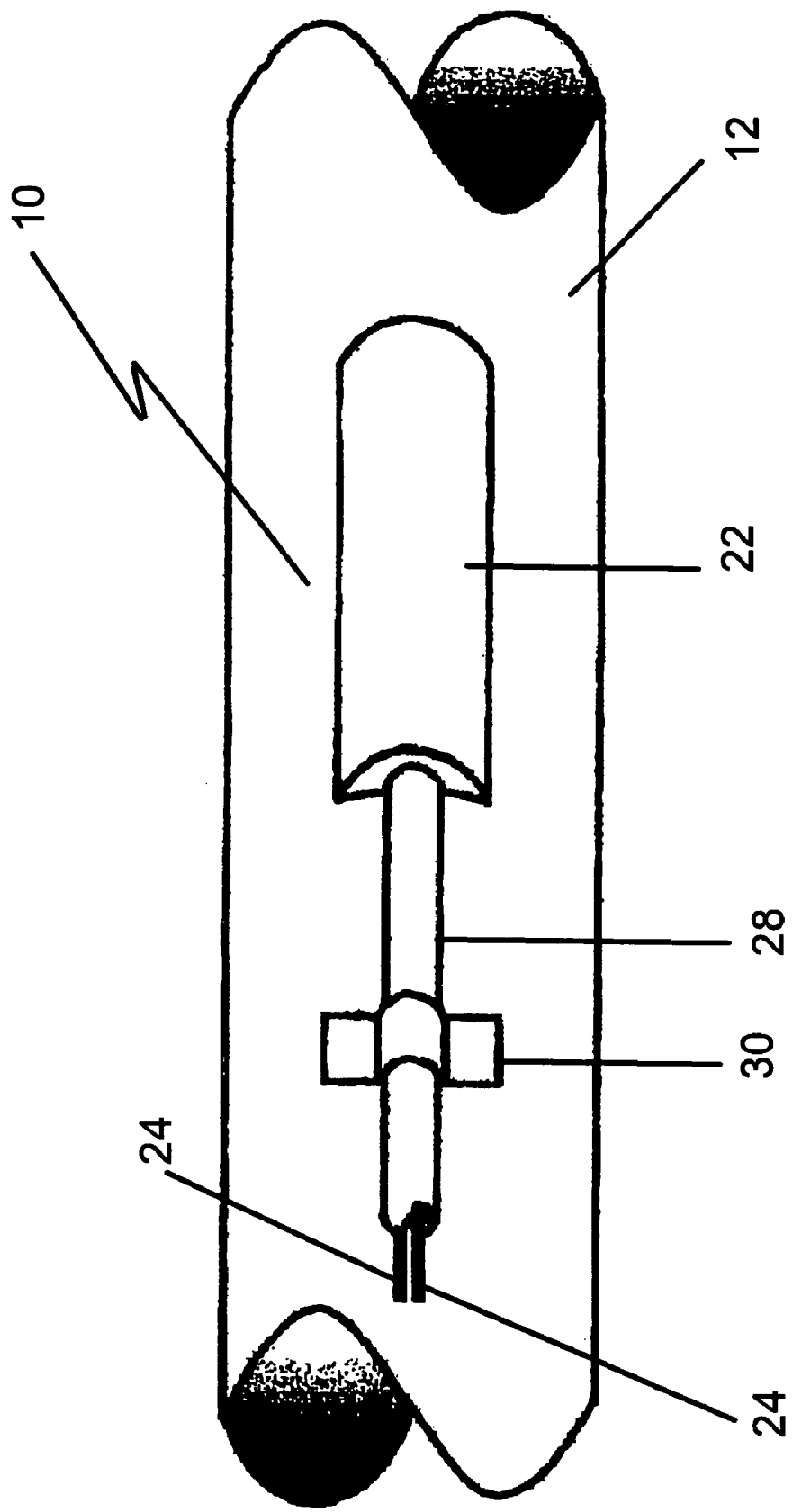
FIG. 1 is a perspective view of a temperature sensor constructed in accordance with the teachings of the present invention positioned on a tube or pipe with an overlying insulated heat shield.

The preferred embodiment, a temperature sensor generally identified by reference numeral 10, will now be described with reference to FIG. 1 through FIG. 7.

Figure 2:
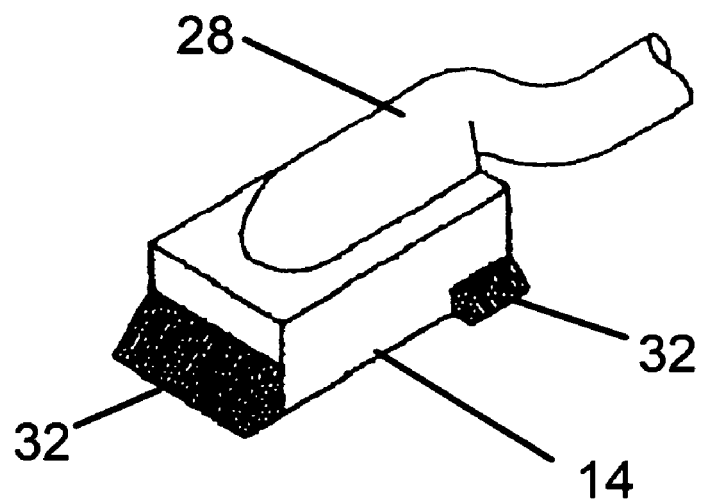
FIG. 2 is a perspective view of the temperature sensor illustrated in FIG. 1, without the overlying insulated heat shield.
Figure 3:
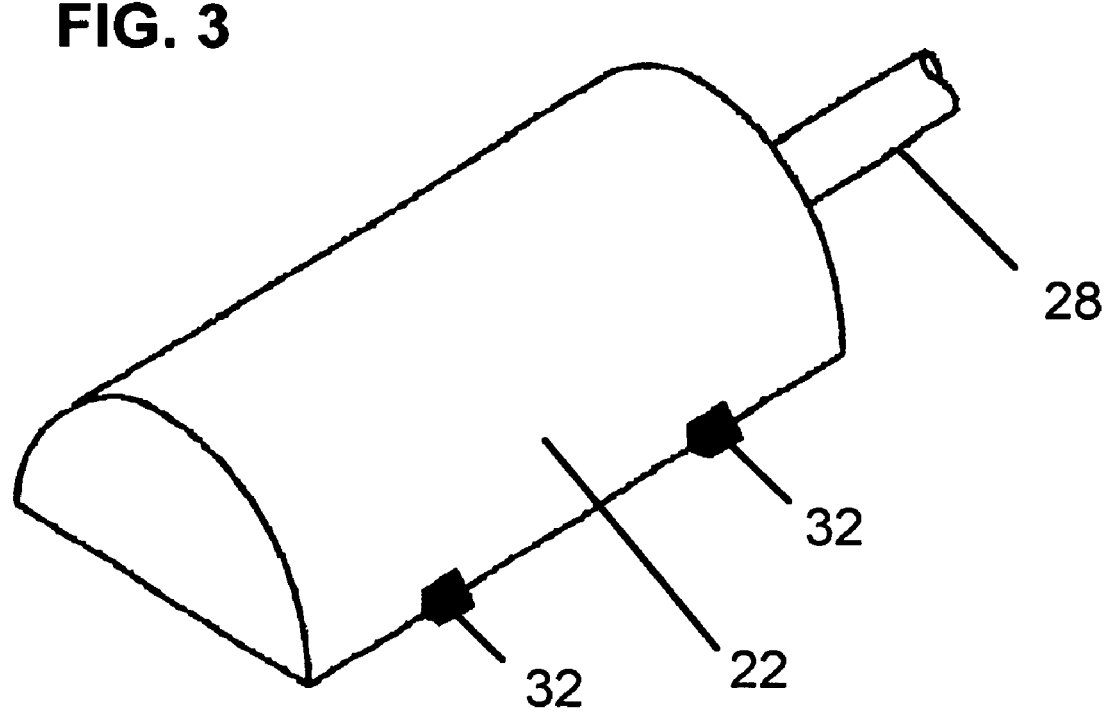
FIG. 3 is a perspective view of the overlying insulated heat shield illustrated in FIG. 1.
Figure 4:
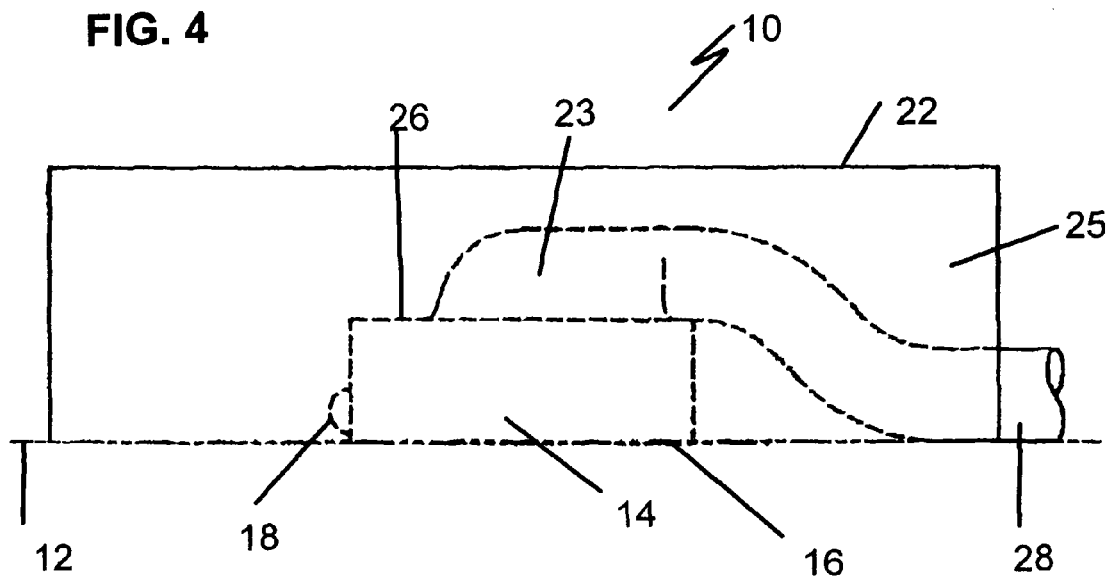
FIG. 4 is a side elevation view of the overlying insulated heat shield illustrated in FIG. 3.
Figure 5:
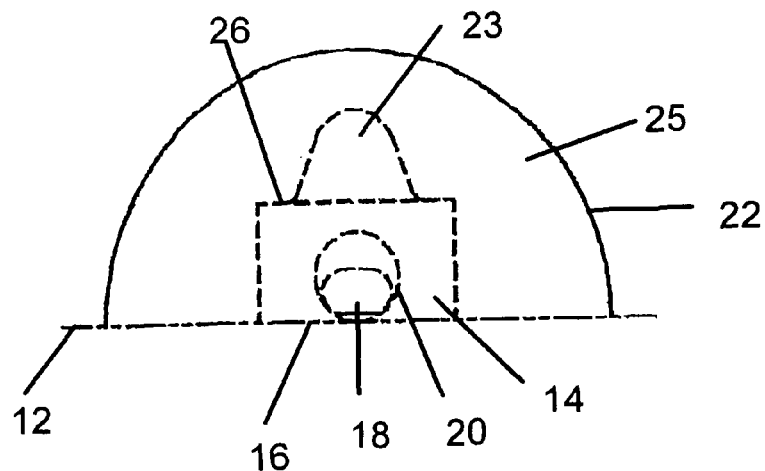
FIG. 5 is an end elevation view of the overlying insulated heat shield illustrated in FIG. 3.
Figure 6:
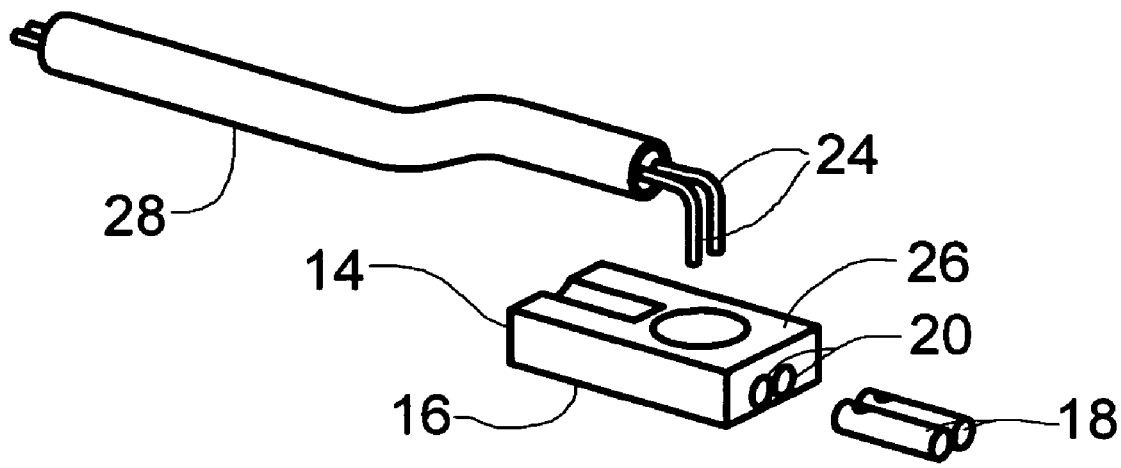
FIG. 6 is an exploded perspective view of the temperature sensor depicted in FIG. 1 without the heat shield.
Figure 7:
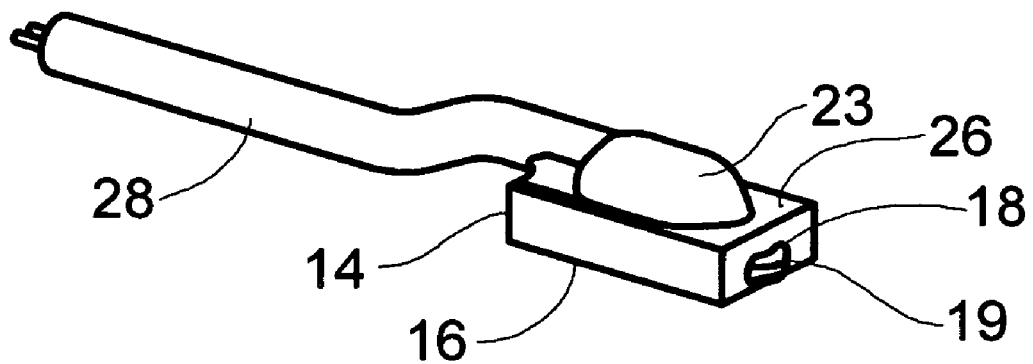
FIG. 7 is a perspective view of the temperature sensor depicted in FIG. 1 without the heat shield.

Structure and Relationship of Parts:

Referring to FIG. 1, temperature sensor 10 is shown installed on a tube or pipe 12, such as are found in boilers. Referring to FIG. 6, temperature sensor 10 is composed of a heat conducting parallelepiped metallic contact pad 14 having a contact surface 16. A sensor probe 18 is positioned in a round hole 20 drilled in contact pad 14. As depicted in FIG. 6 as opposed to FIG. 5, sensor probe 18 is made up of two parts, such that two holes 20 are required. In FIG. 5, sensor probe 18 is made up of only one part, and thus one hole 20 is sufficient. Referring to FIG. 7, the two parts of sensor probe 18 are connected by a junction 19. In this preferred embodiment, sensor probe 18 is spaced inwardly from contact surface 16, such that sensor probe 18 only receives indirect heat conducted through contact pad 14. It has found that this provides the most accurate readings. Referring to FIG. 3, contact pad 14 has an overlying insulating metallic shroud 22. Referring to FIGS. 4 and 5, insulating metallic shroud is filled with insulation 25. Referring to FIG. 1, conductive wires 24 extend through a protective conduit 28. Conduit 28 is, preferably, secured to tube or pipe 12 by a bracket 30. Referring to FIG. 6, conductive wires 24 enter contact pad 14 through a surface 26 opposed to contact surface 16 and extend through contact pad 14 connecting to sensor probe 18. Referring to FIG. 7, there is a layer of ceramic insulation 23 covering the connection between wires 24 and sensor probe 18. Referring to FIG. 2, fillet welds 32 are used to secure contact pad 14 in position.

Operation:

Referring to FIG. 4, in order to install temperature sensor 10, contact surface 16 of contact pad 14 is placed in direct contact with tube or pipe 12. Referring to FIG. 2, contact pad 14 is then secured in position by placing fillet welds 32 at the locations indicated. Referring to FIG. 1, conduit 28 is secured to tube or pipe 12 with bracket 30. Shroud 22 is then placed over contact pad 14. Referring to FIG. 3, shroud 22 is secured to tube or pipe 12 with fillet welds 32 at the locations indicated. Referring to FIG. 4 and FIG. 5, temperature variations are detected by sensor probe 18. Referring to FIG. 6, sensor probe 18 is positioned within the drilled round holes 20 in contact pad 14. As sensor probe 18 is inset slightly from tube or pipe 12, contact pad 14 prevents sensor probe 18 from coming into direct contact with tube or pipe 12. Sensor probe 18 detects the temperature of tube or pipe 12 through contact pad 14. It has been found that this results in more accurate temperature readings. Referring to FIG. 1, conductive wires 24 convey the readings of sensor 18 via conduit 28 out of metallic shroud 22 to an output (not shown).

Figure 8:
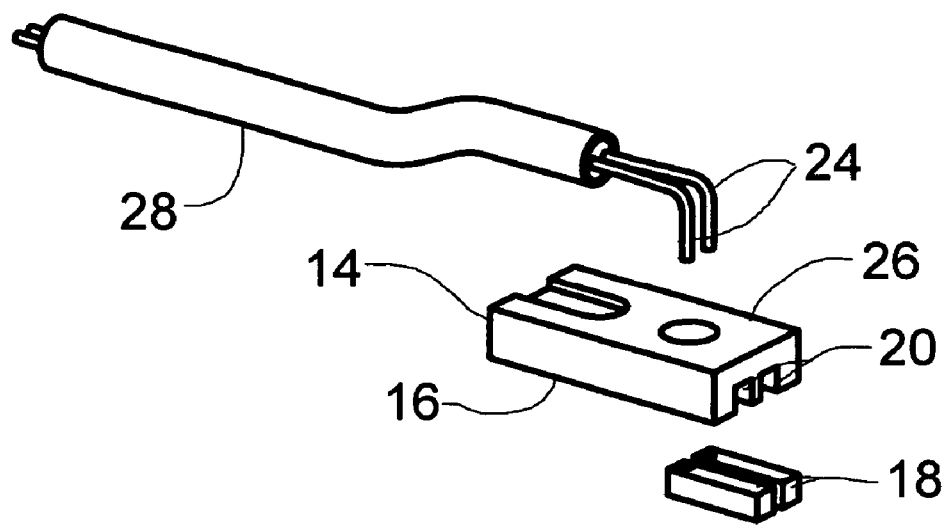
FIG. 8 is an exploded perspective view of an alternative embodiment of the temperature sensor depicted in FIG. 1 without the heat shield.
Figure 9:
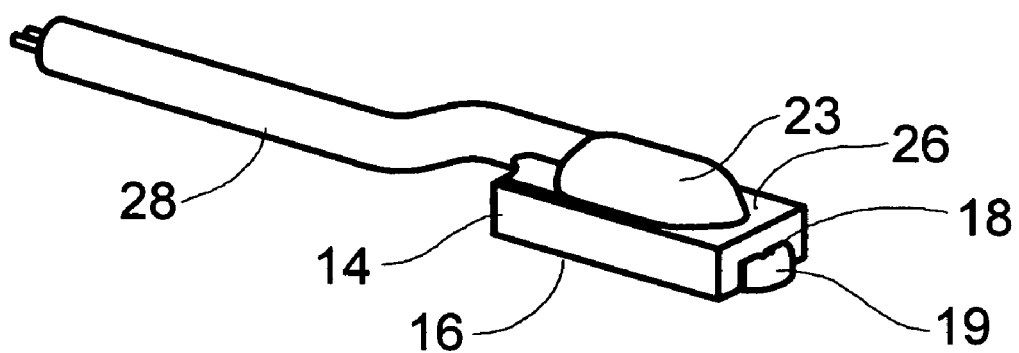
FIG. 9 is a perspective view of an alternative embodiment of the temperature sensor depicted in FIG. 1 without the heat shield.

Variations:

Referring now to FIGS. 8 and 9, an alternative embodiment is shown, where sensor probe 18, having a square cross-section, is positioned within channel 20 in contact surface 16, which has a corresponding square cross-section. In this embodiment, sensor probe 18 will be in direct contact with tube or pipe 12. This is a workable embodiment. However, the preferred embodiment is that shown in FIGS. 6 and 7, as it has been found that indirect contact between tube or pipe 12 and sensor probe 18 improves accuracy.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

It will be apparent to one skilled in the art that modifications may be made to the illustrated embodiment without departing from the spirit and scope of the invention as hereinafter defined in the Claims.

What is claimed is:

1. A temperature sensor, comprising:

a heat conducting parallelepiped metallic contact pad having a contact surface for direct physical contact with a workpiece, the contact pad has an overlying insulated heat shield, which thermally isolates all surfaces of the contact pad except the contact surface;

at least one sensor probe positioned in a round hole drilled in the contact pad, the at least one sensor probe being spaced inwardly from the contact surface, such that the sensor probe only receives indirect heat conducted through the contact surface of the contact pad, the at least one sensor probe being made of two parts which are positioned in parallel orientation and connected by a junction which protrudes externally from a hole in the contact pad, the external junction being parallel to the contact surface; and conductive wires extending through the contact pad and connected to the sensor probe, the conductive wires entering the contact pad through a surface opposed to the contact surface.

* * * * *